Nov. 28, 1961     A. P. JENTOFT     3,010,692
EXPANSIBLE CONICAL PLUG VALVE
Filed Nov. 20, 1959     2 Sheets-Sheet 1
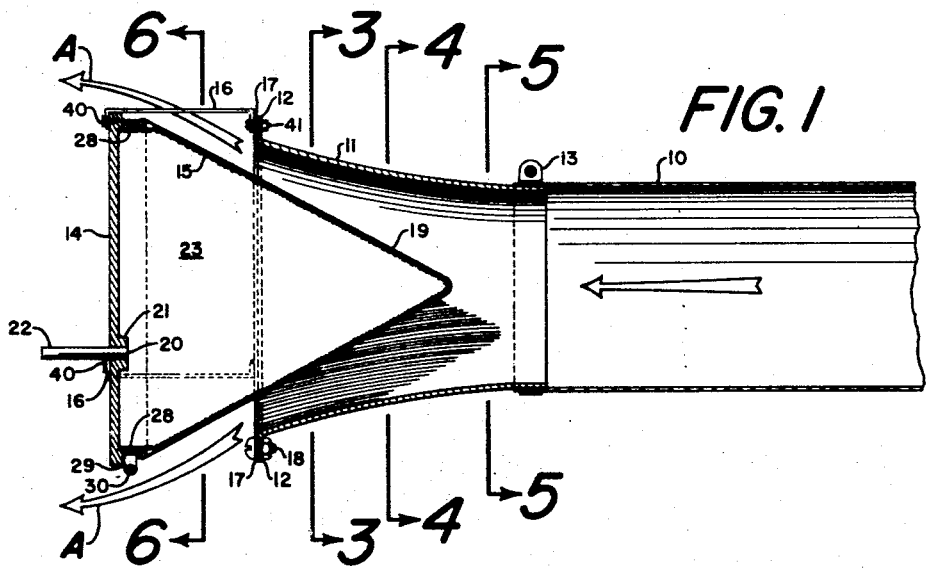
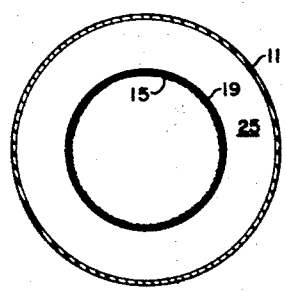
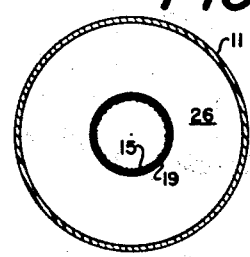
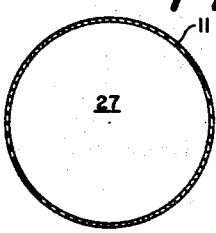
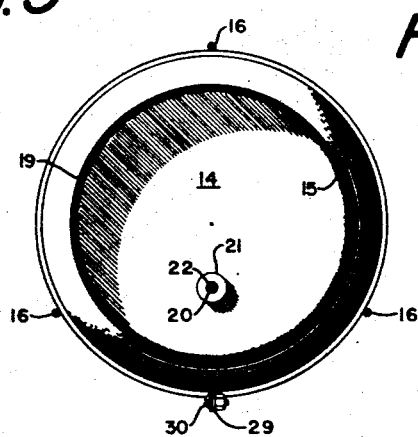
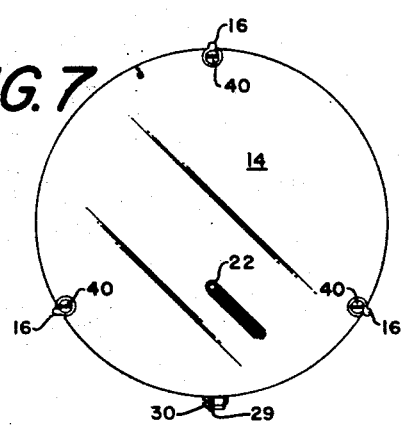
INVENTOR.
ARTHUR P. JENTOFT
BY Harry B. Keck
ATTORNEY Nov. 28, 1961  A. P. JENTOFT  3,010,692
EXPANSIBLE CONICAL PLUG VALVE
Filed Nov. 20, 1959  2 Sheets-Sheet 2
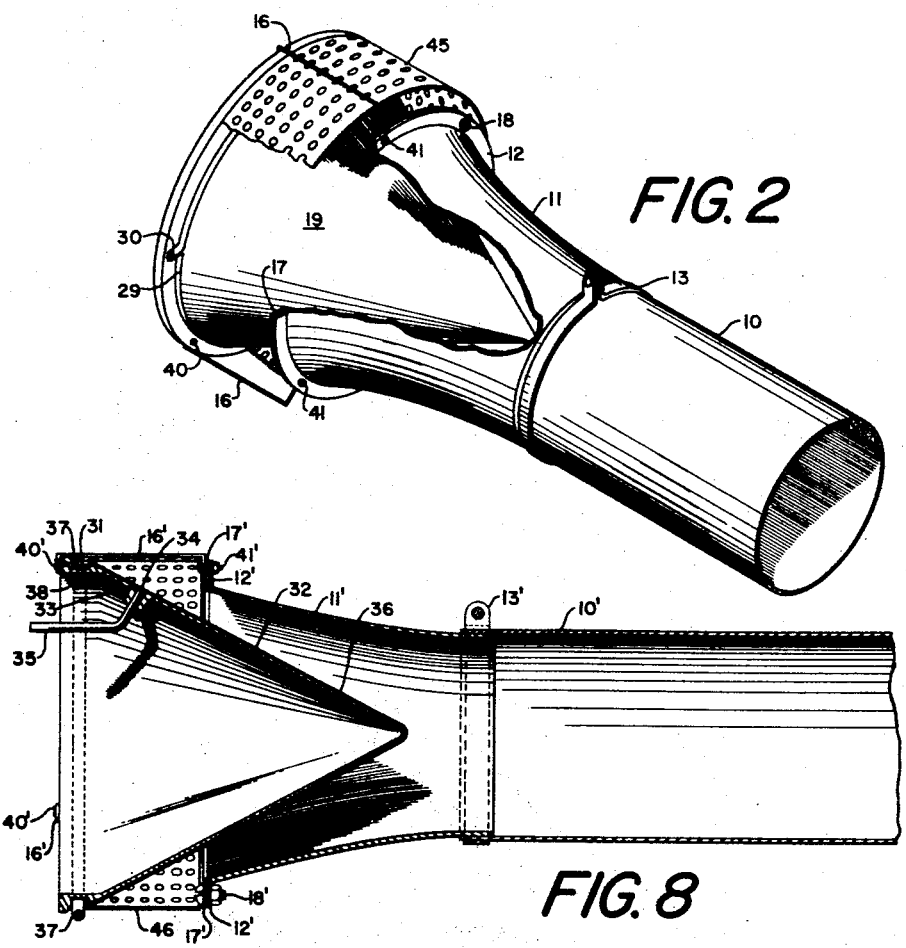
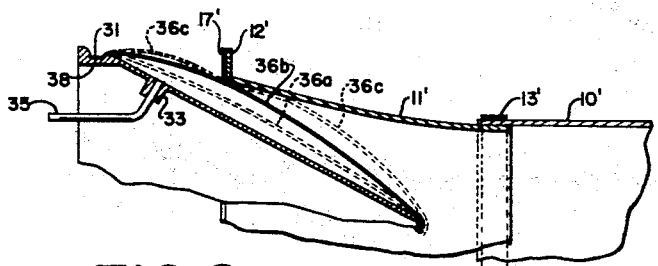
INVENTOR.
ARTHUR P. JENTOFT
BY
ATTORNEY

United States Patent Office 3,010,692
Patented Nov. 28, 1961

3,010,692
EXPANSIBLE CONICAL PLUG VALVE
Arthur P. Jentoft, Wexford, Pa., assignor to
H. H. Robertson Company
Filed Nov. 20, 1959, Ser. No. 854,376
7 Claims. (Cl. 251—61)

This invention relates to valve means for regulating the discharge of gases from a conduit. More particularly the present invention is concerned with a valve comprising an outwardly expansible conical plug mounted in a flared terminal portion of a gas flow conduit.

The present invention is particularly useful in the ventilation art.

According to the present invention, I provide a conical plug axially aligned in an outwardly flared horn which communicates with a gas passageway or duct. An expansible membrane is secured over the conical plug. An annular gas passageway is defined by the membrane and the inner surface of the flared horn. Inflating means are provided whereby the membrane can be caused to bulge outwardly from the conical plug toward the inner surface of the horn to decrease the annular area available for the flow of gases between the membrane and the outwardly flared horn.

Valves according to the present invention can be operated conveniently from a remote control point. Relatively low gas pressures are required to inflate the membrane and thereby to operate the present valve. By virtue of the resilient character of the membrane, the present valve regulates gas flows at a low noise level. The present valve is easily assembled, installed and dismantled. The present valve requires no delicate alignment adjustments which have disadvantageously affected terminal plug valves of the prior art. The present valve achieves a linear gas flow with respect to the applied control pressures. This valve is inexpensive to manufacture and maintain. The present valve is free of mechanical moving parts with the exception of a long-lasting expansible membrane which can be readily replaced if required. The circular cross-section of the present valve renders it readily adaptable to standard piping systems. By virtue of its direct operation, the present valve does not experience any mechanical lag which is comonplace in similar valves which depend for their operation on air motors or mechanical linkages.

The principal object of this invention is to provide a novel valve for controlling the flow of gases which are discharged from a conduit into an enlarged chamber.

The present invention, its objects and advantages will be described by reference to the accompanying drawings in which:

FIGURE 1 is a cross-sectional illustration of a preferred embodiment of the present valve;

FIGURE 2 is a perspective illustration of the valve of FIGURE 1 including a sound dampening screen;

FIGURES 3, 4 and 5 are cross-sectional views of the present valve taken respectively along the lines 3—3, 4—4 and 5—5 of FIGURE 1;

FIGURE 6 is a cross-section view of the present valve taken along the line 6—6 of FIGURE 1 showing internal connections;

FIGURE 7 is a side elevation view of the discharge end of the valve of FIGURE 1;

FIGURE 8 is a cross-section view of an alternative embodiment of the present valve, and FIGURE 9 is a fragmentary cross-section view of the valve of FIGURE 8 showing the closure action in phantom outline.

Referring to FIGURE 1, a gas conduit 10 of circular cross-section serves to convey gases such as ventilating air. The discharge of gases from the conduit 10 can be regulated by means of the terminal valve of this invention. A flared horn 11 has a radial flange 12 at its expanded end and is engageable at its narrow end with the conduit 10. A connector strap 13 is provided to secure the horn 11 to the conduit 10. The flared horn 11 preferably is formed by spinning a metal tube such as aluminum or steel.

A conical plug includes a circular base plate 14 which joins at its periphery with a conical perforate member 15 which is axially aligned with the horn 11. Support arms 16 are secured, for example, by means of bolts 40, to the base plate 14 and by means of bolts 41 to a circular ring 17 corresponding to the radial flange 12. The circular ring 17 may be secured to the radial flange 12 by means of bolts 18. The conical perforate member 15 may be formed from metal screening perforated metal sheeting, or any suitable solid material. The base plate 14 preferably is formed from a metal stamping or die casting.

A conical expansible membrane 19 externally surrounds the conical perforate member 15 and is secured at its base to the base plate 14. The conical membrane preferably is formed from a resilient plastic material such as rubber, neoprene and the like. A peripheral groove 28 is provided in the base plate 14 to anchor the base of the conical membrane 19. A circular strap 29 fits into the peripheral groove 28 over the base of the conical membrane 19 and is secured by means of a fastening bolt 30.

An aperture 20 in the base plate 14 is provided with an internal boss 21 and is internally threaded to receive a control air conduit 22. The control air conduit 22 extends to a pressurized air supply (not shown).

A chamber 23 of conical configuration is defined by the base plate 14 and the conical membrane 19. In its normal relaxed position, the conical membrane 19 totally engages the outer surface of the conical perforate member 15 at maximum displacement from the inner surface of the flared horn 11. An annular gas passageway is presented for the discharge of air from the conduit 10 as indicated by the arrows A.

When the pressure within the chamber 23 is increased above the external pressure, the expansible conical membrane 19 bulges outwardly to reduce the area of the annular passageway between the conical membrane 19 and the inner surface of the horn 11, thereby increasing the resistance presented to the outward flow of gases from the conduit 10. When sufficient pressure is provided within the chamber 23, the conical membrane 19 engages the inner surface of the flared horn 11 to confine the gases within the conduit 10. The conical perforate member 15 serves to prevent collapse of the conical membrane 19. Its perforations allow for instantaneous response of the membrane 19 to changes in pressure within the chamber 23.

The expansible membrane 19 preferably is formed from pliable resilient material such as rubber in its natural or synthetic forms. Excellent results have been obtained with neoprene membranes. In a valve mounted at the terminus of a six-inch conduit, a conical membrane of neoprene having a thickness of 0.02 to 0.10 inch has been satisfactory.

As will be seen from FIGURES 3, 4 and 5, the area for flow of gases is maintained substantially constant along the length of the horn 11 when the membrane 19 is in its relaxed position. That is the annular area 25 (FIGURE 3) is substantially equal to the annular area 26 (FIGURE 4) and substantially equal to the cross-sectional area 27 of the inlet portion of the horn 11 (FIGURE 5). As the pressure within the chamber 23 is increased, the expansible membrane 19 bulges outwardly thereby reducing the area of the annular sections 25 and 26, for example.

As the membrane 19 is inflated, it is lifted entirely away from the conical support 15 and hence its tip portion advances inwardly toward the narrow end of the horn 11.

It will be seen that no delicate alignment is required for the installation of the present valve. Removal of the bolts 18 permits dismantling of the valve in the event replacement of the membrane 19 is required. The material and dimensions selected for the fabrication of the conical membrane 19 permit control of the relation between the internal pressure in the chamber 23 and the outlet flow rate of the gases.

An alternative, lightweight embodiment of this invention is illustrated in FIGURE 8. Prime numerals are employed in FIGURE 8 to indicate analogous elements already described. A conical ring 38 having a peripheral groove 31 is joined to the base of an imperforate cone 32. The imperforate cone 32 preferably is formed by spinning a metal plate of aluminum or steel. An internally threaded boss 33 communicates with an aperture 34 in the imperforate cone 32 and receives a threaded air control conduit 35. Support members 16' are secured at one end to the ring 38 and at the other end to a circular ring 17' which may be bolted to the radial flange 12' of a flared horn 11' by means of bolts 18'.

A resilient conical membrane 36 fits over the outside of the imperforate cone 32 and is secured at its base by means of a metal strap 37 which fits snugly into the peripheral groove 31.

A chamber for receiving control air is formed between the conical membrane 36 and the imperforate cone 32. Introduction of control air through the air control conduit 35 and the aperture 34 causes the conical membrane 36 to bulge outwardly toward the inner surface of the flared horn 11' whereby the cross-sectional area of the annular gas passageway between the conical membrane 36 and the flared horn 11' is diminished. The valve closure is more clearly illustrated in FIGURE 9. As operating air is introduced through the conduit 35, the resilient conical membrane first bulges outwardly as shown at 36a to restrict the annular area available for gas flow, thereby serving to throttle the flow. Introduction of additional gas through the conduit 35 causes further distention of the membrane 36 to the position indicated at 36b, i.e., into peripheral engagement with the flared horn 11'. Further introduction of air through the conduit 35 causes still further distention of the membrane 36 as shown at 36c wherein the membrane 36 is in peripheral contact with the flared horn 11' over a substantial peripheral area.

The principal advantage of the embodiment illustrated in FIGURE 8 is a lightweight construction.

The unique construction of the present valve permits addition of a sound-dampening screen to minimize the noise level of discharging gases. Such a screen is illustrated in FIGURES 2 and 8. As shown in FIGURE 2, a flat band 45 of perforated metal is rolled into a cylinder and inserted inside the support arms 16. The perforated metal band 45 creates a slight back pressure in the discharging gases and achieves a geometrically uniform gas discharge which lowers the noise level of the gas discharge. A similar flat band 46 of perforated metal may be rolled into a cylinder and inserted inside the support arms 16' as shown in FIGURE 8. In place of perforated metal, the sound-dampening screen may comprise metallic mesh, fibrous or plastic mesh, filamentary batts of mineral fibers and the like.

According to the provisions of the patent statutes, I have explained the principle, preferred embodiment and mode of operation of my invention and have illustrated and described what I now consider to represent its best embodiment. However, I desire to have it understood that, within the scope of the appended claims, the invention may be practiced otherwise than as specifically illustrated and described.

I claim:

1. A gas flow regulating valve for controlling the flow of gas from a conduit terminal, comprising an outwardly flared horn engageable in communicating relation at its narrow end with said conduit terminal, a rigid conical base secured in axially aligned, spaced relation to the inner surface of said horn, a conical membrane of resilient, expansible material surrounding said rigid conical base and being secured at its base to the base of said rigid conical base and being in its relaxed condition in surface engagement with said rigid conical base, and an inlet tube extending through one wall of said rigid conical base to admit fluids between said membrane and said rigid conical base whereby said conical membrane may be extended radially to constrict the space between said membrane and said horn.

2. A gas flow regulating valve for controlling the flow of gas from a conduit terminal, comprising an outwardly flared horn engageable in communicating relation at its narrow end with said conduit terminal, a base plate secured in spaced outer relation to the expanded end of said horn, a conical membrane of resilient, expansible material secured at its base to said base plate and extending coaxially into said horn and being in its relaxed condition spaced apart from the inner wall of said horn to provide an annular gas passageway leading outwardly from said conduit, said conical membrane and said base plate forming an enclosed valve operating chamber, and an inlet tube extending into said valve operating chamber to admit fluids thereinto whereby said conical membrane may be extended outwardly to constrict the annular space between said membrane and said horn.

3. A gas flow regulating valve for controlling the flow of gas from a conduit terminal, comprising an outwardly flared horn engageable in communicating relation of its narrow end with said conduit terminal, an imperforate rigid cone in axially aligned, spaced relation to the inner surface of said horn whereby an annular gas passageway is formed leading from said conduit terminal between said horn and said rigid cone, a conical membrane of resilient, expansible material surrounding said rigid cone and being secured at its base to the base of said rigid cone, and an inlet tube extending through a conical wall of said rigid cone to admit fluids between said rigid cone and said conical membrane whereby said conical membrane may be extended radially to constrict the space between said membrane and said horn.

4. A gas flow regulating valve for controlling the flow of gas from a conduit terminal, comprising an outwardly flared horn engageable in communicating relation at its narrow end with said conduit terminal, a rigid conical base secured in axial aligned, spaced relation to the inner surface of said horn by means of spaced support arms extending from said base to the rim of said horn, a conical membrane of resilient, expansible material surrounding said rigid conical base and being secured at its base to the base of said rigid conical base and being in its relaxed condition in surface engagement with said rigid conical base, and an inlet tube extending through one wall of said rigid conical base to admit fluids between said membrane and said rigid conical base whereby said conical membrane may be extended radially to constrict the space between said membrane and said horn.

5. A gas flow regulating valve for controlling the flow of gas from a conduit terminal, comprising an outwardly flared horn engageable in communicating at its narrow end with said conduit terminal, a base plate secured in spaced outer relation to the expanded end of said horn by means of spaced support arms extending from said base to the rim of said horn, a rigid, perforate cone extending from said base plate coaxially into said horn, a conical membrane of resilient, expansible material secured at its base to said base plate and extending coaxially into said horn and being in its relaxed condition spaced apart from the inner wall of said horn substantially overlying said rigid cone to provide an annular gas passageway leading outwardly from said conduit, said conical membrane and said base plate forming an enclosed valve operating chamber, and an inlet tube extending into said valve operating chamber to admit fluids thereinto whereby said conical membrane may be extended outwardly to constrict the annular space between said membrane and said horn.

6. A gas flow regulating valve for controlling the flow of gas from a conduit terminal, comprising an outwardly flared horn engageable in communicating relation at its narrow end with said conduit terminal, a rigid conical base secured in axially aligned, spaced relation to the inner surface of said horn by means of spaced support arms extending from said base to the rim of said horn, a conical membrane of resilient, expansible material surrounding said rigid conical base and being secured at its base to the base of said rigid conical base and being in its relaxed condition in surface engagement with said rigid conical base, an inlet tube extending through one wall of said rigid conical base to admit fluids between said membrane and said rigid conical base whereby said conical membrane may be extended radially to constrict the space between said membrane and said horn, and a cylindrical band of perforate metal sheet mounted between the rim of said horn and said rigid conical base within said spaced support arms.

7. A gas flow regulating valve for controlling the flow of gas from a conduit terminal, comprising an outwardly flared horn engageable in communicating relation at its narrow end with said conduit terminal, a rigid conical base secured in axially aligned, spaced relation to the inner surface of said horn, a conical membrane of resilient, expansible material surrounding said rigid conical base and being secured at its base to the base of said rigid conical base and being in its relaxed condition in surface engagement with said rigid conical base, said conical membrane being outwardly expansible away from said rigid conical base upon the introduction of fluids between said conical membrane and said rigid conical base to constrict the space between said membrane and said horn, and conduit means for introducing fluids and withdrawing fluids between said conical membrane and said rigid conical base.

References Cited in the file of this patent

UNITED STATES PATENTS

| | | |
|---|---|---|
| 848,739 | Gut | Apr. 2, 1907 |
| 2,336,450 | Voorhess | Dec. 7, 1943 |
| 2,698,711 | Newcomb | Jan. 4, 1955 |

FOREIGN PATENTS

| | | |
|---|---|---|
| 360,727 | Great Britain | Nov. 12, 1931 |
| 986,047 | France | Mar. 12, 1951 |